(12) United States Patent
Chang et al.

(10) Patent No.: US 6,483,841 B1
(45) Date of Patent: Nov. 19, 2002

(54) SYSTEM AND METHOD FOR REDUCING CAPACITY DEMAND OF ETHERNET SWITCH CONTROLLER

(75) Inventors: Chung-Ju Chang, Hsinchu (TW);
Huai-Chih Ma, Hsinchu (TW);
Chih-Sheng Chang, Hsinchu (TW);
Jiunn-Bin Chen, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/260,073

(22) Filed: Mar. 2, 1999

(51) Int. Cl.[7] ............................................. H04L 12/56
(52) U.S. Cl. ........................ 370/412; 370/413; 370/419
(58) Field of Search ................................. 370/359, 412, 370/413, 414, 415, 416, 417, 418, 419, 428, 429; 710/1, 3, 52

(56) References Cited

U.S. PATENT DOCUMENTS 5,633,865 A * 5/1997 Short .......................... 370/412
5,802,054 A * 9/1998 Bellenger ..................... 370/401
5,923,654 A * 7/1999 Schnell ........................ 370/427
6,343,072 B1 * 1/2002 Bechtolsheim et al. ...... 370/412

OTHER PUBLICATIONS

Cohen et al, ATOMIC : A Low–Cost, Very High–Speed, Local Communication Architecture, 1993 International Conference on Parallel Processing, USC, pp. 1–8, 1993.*

* cited by examiner

Primary Examiner—Wellington Chin
Assistant Examiner—Frank Duong
(74) Attorney, Agent, or Firm—Winston Hsu

(57) ABSTRACT

The present invention is to provide an Ethernet switch fabric controller requiring output port buffer unit of less capacity while still working with an Ethernet switch to smoothly forward the packet from each input port of the Ethernet switch to an output port corresponding to the packet header at the input port. It is featured by the use of proper number of temporary buffer units each of proper length, and output port buffer unit of proper length.

17 Claims, 5 Drawing Sheets

Fig.1(Priot Art)

SYSTEM AND METHOD FOR REDUCING CAPACITY DEMAND OF ETHERNET SWITCH CONTROLLER

FIELD OF THE INVENTION

The present invention relates to a device and method to be applied to a switch fabric controller, particularly applied to an Ethernet switch fabric controller for reducing circuit capacity demand or circuit size.

BACKGROUND OF THE INVENTION

As shown in FIG. 1, a conventional Ethernet switch fabric controller 10 for controlling the switching operation of an Ethernet switch 20, comprises a plurality of command interpreters 13 each associated with an input port of the Ethernet switch, a read/write server 14, and an output port buffer composed of a plurality of output port buffer units 16. When an input port requests packet forwarding (or switching) to an output port, its packet header will be temporarily saved in the command interpreter 13 waiting for the polling by the Read/Writer Server. The Read/Writer Server periodically checks each command interpreter 13 to decode the packet header therein and forward the packet header to a corresponding output port buffer unit according to the decoding. The Ethernet switch 20 forwards the packet in the input port which has had packet header forwarded to the corresponding output port buffer unit, to the output port which is associated with the corresponding output port buffer unit.

The Read/Writer Server 14 comprises a sequential polling controller for polling each command interpreter 13 to forward the packet header in an input port to a corresponding output port buffer unit indicated by the packet header. The polling operation of an Ethernet switch fabric controller is subject to two requirements: fair and fast. Fair operation means each input port must be polled periodically with the same period or the same frequency while fast operation means Full Line Traffic characterized in that the processing time for a packet header in a Ethernet switch fabric controller shall be no more than 960 ns, in order to eliminate the possibility of Latency Delay longer than 960 ns for a packet forwarding in an Ethernet Switch Fabric controller.

The output port buffer unit is for saving packet header when there are two or more than two packet headers to be forwarded to the same output port, or when a packet header is to be forwarded to an output port which has not yet completed the processing of a packet header already saved therein.

The Ethernet switch forwards the packet in an input port (which had requested a packet switching) to an output port which corresponds to the packet header of the packet in the input port. A packet header is saved in a corresponding output port buffer unit before forwarding (or switching) of its packet is completed or processed. An overflow occurs when the number of input ports requesting packet switching to the same output port is larger than the length of the output port buffer unit. The length of an output port buffer unit means the number of memory units each for saving a packet header corresponding to the output port buffer unit. The simplest way to design the output port buffer unit is to have it composed of N memory units to avoid the overflow, with N equal to the number of input ports. For example, N equals 32 (means that the length of each of 32 output port buffer units is 32) if the number of input ports of the Ethernet switch is 32. The kind of design, however, inevitably results in a large number of logic gates in an Ethernet switch fabric controller, and leads to significantly low capacity utilization rate. For example, such a conventional design requires 32*32=1024 memory units for a system with 32 input ports. A better design is therefore strongly expected.

The length of the output port buffer unit shall be designed so as to minimize the number of logic gates required for an Ethernet switch fabric controller. The Read/Writer Server must be so designed that it can determine and/or control the forwarding operation of each packet header from a input port to an output port.

SUMMARY OF THE INVENTION

Definitions $A*B$: mathematical product of A and B where A and B are any numbers.

Corresponding output port buffer unit of a packet header: the output port buffer unit with identification code corresponding to a code indicated by the packet header usually for selecting the output port to which the packet containing the packet header shall be forwarded (or switched).

Destination output port buffer unit of a packet header: the output port buffer unit with identification code corresponding to a destination address code indicated by the packet header usually for pointing to the output port to which the packet containing the packet header shall be forwarded (or switched).

Length of a buffer unit (temporary buffer unit or output port buffer unit): number of the buffer unit's memory units each for saving a packet header.

Memory unit: each memory unit for saving a packet header.

Recognize a packet header: read the code or destination address code indicated by a packet header in order to know the destination output port of the packet header.

Retrieve a packet header from an input port: move a packet header from an input port and decode the packet header to know the destination output port of the packet header.

Objects

An object of the present invention is to provide an Ethernet switch fabric controller requiring output port buffer unit of less capacity (output port buffer unit of length smaller than the number of input ports, for example) while still working with an Ethernet switch to smoothly forward the packet from an input port to an output port.

Another object of the present invention is to provide a method for designing an Ethernet switch fabric controller requiring output port buffer unit of less capacity (output port buffer unit of smaller length) while still working with an Ethernet switch to smoothly forward the packet from an input port to an output port.

A further object of the present invention is to provide an Ethernet switch fabric controller requiring less logic gates while still working with an Ethernet switch to smoothly forward the packet from an input port to an output port.

Another further object of the present invention is to provide a method for designing an Ethernet switch fabric controller composed of circuits of smaller size while still working with an Ethernet switch to smoothly forward the packet from an input port to an output port.

The present invention is characterized in that at least one temporary buffer unit is used to temporarily save a packet header when there's no available memory unit in the output port buffer unit corresponding to the packet header given that the length of the output port buffer unit is smaller than the number of input ports of the Ethernet switch.

An aspect of the present invention is a device for processing the forwarding of the packet header received by each input port of an Ethernet switch to an output port buffer unit, thereupon the Ethernet switch switches (or forwards) the packet at each input port to an output port according to the packet header in each output port buffer unit. Assume the Ethernet switch comprises M input ports and Q output ports. The device thus suggested by the present invention comprises:

Q output port buffer units each of length N;

J temporary buffer units each of length K, where J and K being integers; and a processor possibly embodied by a CPU or logic circuit for forwarding the packet header received by the input port to a corresponding output port buffer unit in case the corresponding output port buffer unit is in a first state, the corresponding output port buffer unit is one output port buffer unit corresponding to the packet header, and forwarding, in case the corresponding output port buffer unit is in a second state, the packet header to a corresponding temporary buffer unit which is one temporary buffer unit in a first state, and forwarding the packet header in the temporary buffer unit to the output port buffer unit having at least an available memory unit and corresponding to the packet header of the data packet in the temporary buffer unit. The corresponding output port buffer unit is in the first state when having at least an available memory unit therein, and is in the second state when having no available memory unit therein. The temporary buffer unit is in the first state when having at least an available memory unit therein and having no packet header which is corresponded by any output port buffer unit different from the corresponding output port buffer unit that is an output port buffer unit corresponding to the packet header currently considered for being forwarded to the temporary buffer unit, i.e., a temporary buffer unit is in the first state when having at least an available memory unit therein and each packet header therein is corresponded by the corresponding output port buffer unit (the output port buffer unit which corresponds to the packet header currently considered for being forwarded to the temporary buffer unit).

In the embodiment M is equal to Q, N is smaller than M, J is chosen to equal [(M/N)−1], and K is chosen to equal (M−N), as suggested by the present invention and explained below.

It is reasonable to have a condition that no packet header will be admitted to an input port unless the input port currently has no packet header therein or has completed the processing (forwarding to a proper temporary buffer unit or output port buffer unit) of a packet header previously received, i.e., there are at most 32 packet headers in an Ethernet switch fabric controller if there are 32 input ports in the Ethernet switch working with the Ethernet switch fabric controller, for example.

Let's first consider the length of the temporary buffer unit. Assume the number of input ports is M and the length of output port buffer unit is N (here N<M), the worst case is that the destination output port buffer unit (corresponding output port buffer unit) of the packet header in each of the N input ports is the same at one time, resulting in the need of forwarding N packet headers to the destination output port buffer unit and forwarding (M−N) packet headers to the same temporary buffer unit, leading to the consideration of designing the temporary buffer unit of length (M−N).

Let's now consider the number of temporary buffer units for the case that M is divisible by N. In case the number of full output port buffer units (the output port buffer unit with every memory unit therein saving a packet header) at one time is M/N, there's no need of forwarding any packet header to a temporary buffer unit. Another case is that the number of full output port buffer units is (M/N−1) while there are N requests for entering these (M/N−1) full output port buffer units at the same time (there are N packet headers waiting to be forwarded to these full output port buffer units at the same time), therefore we may choose (M/N−1) as the number of temporary buffer units each of length (M−N). It can be seen the total number of the memory units, including those [(M/N−1)*(M−N)] of all temporary buffer units and those M*N of all output port buffer units, is {M*N+[(M/N)−1]* (M−N)}. For an example of 32 input ports and 32 output ports in an Ethernet switch, a feasible configuration suggested by the present invention is that there are 32 output port buffer units each of length N, and [(M/N)−1] temporary buffer units each of length (32−N), with N to be selected for minimizing the number of memory units represented by {M*N+[(M/N)−1]* (M−N)}. The selection of N can be easily done by computation, especially by using a computer.

In case M is not divisible by N, let M/N=U+R where U is the largest integer less than the real value of M/N and R is the remainder of M/N (i.e., R is the difference value between the real value of M/N and U. and is obviously less than N), the number of temporary buffer units is U−1+[R/U] where [R/U] is the largest integer less than the real value of R/U, and the total number of memory units required is M*N+(U−1+[R/U])*(M−N).

It can be easily computed that the relatively smaller number of memory units totally required is 324, 295, 296, 324, and 328 respectively for N=4, N=5, N=6, N=7, N=8 in case M=32. Because the overflow probability of output port buffer for N=8 is lower than that N=4, N=5, N=6, and N=7, 8 is selected to be the length of each of the 32 output port buffer units, and the number of temporary buffer units is 3, leading to the need of only 324 of total memory units, reducing 68.36 percent of memory capacity demand compared to the conventional system where 32*32=1024 memory units are required.

The above processor according to the present invention may comprise: a retrieving controller, and a contention resolution controller; the retrieving controller forwards the packet header from the input port to the contention resolution controller, the contention resolution controller checks if the corresponding output port buffer unit is in the first state, and forwards the packet header to the corresponding output port buffer unit in case the corresponding output port buffer unit is in the first state, while forwards the packet header to the corresponding temporary buffer unit after identifying the corresponding temporary buffer unit among the temporary buffer units. For example, a temporary buffer unit in the first state (a temporary buffer unit having at least an empty memory unit therein, and with each packet header saved therein being corresponded by the destination output port buffer unit of the packet header currently considered for being forwarded, i.e., a temporary buffer unit having at least an empty memory unit therein, and with each packet header saved therein having the same destination output port buffer unit as that of the packet header considered for being forwarded, or a temporary buffer unit having at least an empty memory unit therein, and with each packet header saved therein corresponded by an output port buffer unit which corresponds to the packet header currently considered for being forwarded) is identified to be the corresponding temporary buffer unit for the packet header.

The above processor may further comprise a temporary buffer unit controller for checking if the output port buffer unit corresponding to the packet header in the temporary buffer unit has at least an available memory unit, and for forwarding the packet header in the temporary buffer unit to the output port buffer unit which corresponds to the packet header in the temporary buffer unit and has at least an available memory unit.

The above retrieving controller is a sequential polling controller polling each input port cyclically to forward the packet header from the input port to the contention resolution controller.

The above processor further comprises a plurality of command interpreters each associated with one input port, and in a busy state when a packet header is received thereat the associated input port to wait for being forwarded to the contention resolution controller, and wherein the retrieving controller recognizes the busy state to forward the packet header at the associated input port which is in the busy state to the contention resolution controller.

Another aspect of the present invention is a device for processing the forwarding of the packet header received by each input port of an Ethernet switch to an output port buffer unit of length N, the Ethernet switch comprises M input ports and Q output ports, N is less than M, the number of the output port buffer units is L which may or may not be equal to Q, the device comprises:

J temporary buffer units each of length K, where J and K being integers; and a processor comprising a plurality of P retrieving controllers assigned to respectively correspond to different groups of the input ports, where P being an integer larger than one;

each of the retrieving controllers forwarding the packet header received by the corresponded group of the input ports to the processor, in case the corresponding output port buffer units of the packet headers forwarded by the retrieving controllers to the processor are different from each other, the processor respectively sends the packet headers to the output port buffer units respectively corresponding to the packet headers and having at least an available memory unit, and in case the corresponding output port buffer units of the packet headers forwarded by the retrieving controllers are not different from each other, the processor sends the packet headers having the same corresponding output port buffer units, in the order according to the timestamps representing the time of receiving the packet headers by the input ports, to the same corresponding output port buffer units having at least an available memory unit, while in case the corresponding output port buffer units having no available memory unit, the processor sends the packet headers to the temporary buffer units in a first state after identifying the temporary buffer units in the first state among all the temporary buffer units, the processor sends the packet header in the temporary buffer units to the output port buffer units which respectively correspond to the packet headers in the temporary buffer units and have at least an available memory unit.

The processor according to another aspect of the present invention aforementioned further comprises: a contention resolution controller; and a temporary buffer unit controller; each of the retrieving controllers forwarding the packet headers received by the corresponded group of the input ports to the contention resolution controller, in case the corresponding output port buffer units of the packet headers forwarded by the retrieving controllers are different from each other, the contention resolution controller sends the packet headers to the output port buffer units respectively corresponding to the packet headers and having at least an available memory unit, and in case the corresponding output port buffer units of the packet headers forwarded by the retrieving controllers are not different from each other, the contention resolution controller sends the packet headers having the same corresponding output port buffer unit, in the order according to the timestamps representing the time of receiving the packet headers by the input ports, to the same corresponding output port buffer unit having at least an available memory unit, while in case the corresponding output port buffer unit has no available memory unit, the contention resolution controller sends the packet headers to the temporary buffer unit in the first state after identifying the temporary buffer unit in the first state among the temporary buffer units; the temporary buffer unit controller sends the packet headers in the temporary buffer units to the corresponding output port buffer units (the output port buffer units which respectively correspond to the packet headers in the temporary buffer units) having at least an available memory unit.

An algorithm aspect of the present invention is a process for forwarding the packet header received by each input port of an Ethernet switch to an output port buffer unit of length N, the Ethernet switch comprises M input ports and Q output ports, the number of the output port buffer units is L which may be selected so as to equal Q, the process comprises the steps of:

(a). recognizing the packet header received by the input port (another way is retrieving the packet header from the input port);

(b). identifying the output port buffer unit which corresponds to the packet header as a destination output port buffer unit;

(c). checking if the destination output port buffer unit has at least an available memory unit;

(d). in case there is at least an available memory unit in the destination output port buffer unit, forwarding the packet header from the input port to the destination output port buffer unit;

(e). in case there is no available memory unit in the destination output port buffer unit, forwarding the packet header from the input port to the temporary buffer unit which is in a first state;

(f). whenever one corresponding output port buffer unit, which is one output port buffer unit corresponding to the packet header in the temporary buffer unit, has at least an available memory unit, forwarding the packet header in the temporary buffer unit to the corresponding output port buffer unit.

The above temporary buffer unit is in the first state when having at least an available memory unit and having no packet header therein corresponded by one output port buffer unit different from the destination output port buffer unit.

Another aspect of the above temporary buffer unit is that it is in the first state when having at least an available memory unit therein and the destination output port buffer unit corresponds to each packet header therein.

The above process further comprises a step of computing the J, and the K, so that the J is equal to [(M/N)−1], and the K is equal to (M−N), where N is computed so as to reduce the number of logic gates (memory units) constituting all the output port buffer units and the temporary buffer units, while the process can still avoid the overflow possibly caused by the fact that the length of the output port buffer unit is less than the number M of the input ports.

Another algorithm aspect of the present invention is a process for forwarding the packet header received by each input port of an Ethernet switch to an output port buffer unit of length N, the Ethernet switch comprises M input ports divided into P groups and Q output ports, the N is less than the M, the process comprises the steps of:

(a). simultaneously applying pooling in each of the groups for recognizing, one by one, the packet headers received by the input ports in each of the groups;

(b). identifying destination output port buffer units among the output port buffer units, the destination output port buffer units are the output port buffer units which respectively correspond to the recognized packet headers;

(c). in case the destination output port buffer units are different from each other, respectively sending the recognized packet headers to the destination output port buffer units having at least an available memory unit, and in case the destination output port buffer units are not different from each other, sending the recognized packet headers corresponded by the same destination output port buffer unit, in the order according to the timestamps representing the time of receiving the packet headers by the input ports, to the same the destination output port buffer unit which has at least an available memory unit, while in case the destination output port buffer unit has no available memory unit, sending the packet headers to the temporary buffer units in a first state after identifying the temporary buffer units in the first state among all of the temporary buffer units, the temporary buffer units in the first state are the temporary buffer units which have at least an available memory unit and have the packet headers therein corresponded by the destination output port buffer unit.

(d). sending the packet header in the temporary buffer unit to the destination output port buffer unit (one output port buffer unit which corresponds to the packet header in the temporary buffer unit) having at least an available memory unit.

The above process may also comprise a step of computing the number J of the temporary buffer units, and the length K of each of the temporary buffer units, so that the J is equal to $[(M/N)-1]$, and the K is equal to $(M-N)$, where N is computed so as to minimize the total capacity (number of memory units or logic gates) of all buffer including the temporary buffer units and the output port buffer units, while the process can still avoid the overflow possibly caused by the fact that the length of the output port buffer unit is less than the number M of the input ports.

Another further algorithm aspect of the present invention is a process for forwarding the packet header received by each input port of an Ethernet switch to an output port buffer unit of length N, the Ethernet switch comprises M input ports in P groups and Q output ports, the number L of the output port buffer units may be so selected that the L is equal to the Q, the process comprising the steps of:

(a). simultaneously applying pooling in each of the groups for retrieving, one in one time interval, the packet headers received by the input ports in each of the groups;

(b). identifing destination output port buffer units among the output port buffer units, the destination output port buffer units are the output port buffer units which respectively correspond to the retrieved packet headers;

(c). in case the destination output port buffer units are different from each other, respectively sending the packet headers retrieved from the input ports to the destination output port buffer units having at least an available memory unit, and in case the destination output port buffer units are not different from each other, sending the packet headers which have been retrieved from the input ports and which are corresponded by the same destination output port buffer unit, in the order according to the timestamps representing the time of receiving the packet headers by the input ports, to the same destination output port buffer unit which has at least an available memory unit, while in case the destination output port buffer unit has no available memory unit, sending the packet headers retrieved from the input ports to the temporary buffer units in a first state after identifying the temporary buffer units in the first state among all of the temporary buffer units, the temporary buffer units in the first state are the temporary buffer units which respectively correspond to the retrieved packet headers and have at least an available memory.

(d). sending the packet header in the temporary buffer unit to the destination output port buffer unit (one output port buffer unit which corresponds to the packet header in the temporary buffer unit) having at least an available memory unit.

The another algorithm aspect of the present invention is a process for forwarding the packet header received by each input port of an Ethernet switch to an output port buffer unit of length N, the Ethernet switch comprises M input ports and Q output ports, the number of the output port buffer units may be selected to equal the Q, the process comprises the steps of:

(a). separating (or dividing) M input ports into at least two groups;

(b). simultaneously applying pooling in each of the groups for recognizing, one in one time interval, the packet headers received by the input ports in each of the groups;

(c). identifying destination output port buffer units among the output port buffer units, the destination output port buffer units are the output port buffer units which respectively correspond to the recognized packet headers;

(d). in case the destination output port buffer units are different from each other, respectively sending the recognized packet headers to the destination output port buffer units having at least an available memory unit, and in case the destination output port buffer units are not different from each other, sending the recognized packet headers corresponded by the same destination output port buffer unit, in the order according to the timestamps representing the time of receiving the packet headers by the input ports, to the same the destination output port buffer unit which has at least an available memory unit, while in case the destination output port buffer unit has no available memory unit, sending the packet headers to the temporary buffer units in a first state after identifying the temporary buffer units in the first state among all of the temporary buffer units, the temporary buffer units in the first state are the temporary buffer units which have an available memory unit and have the packet headers therein corresponded by the destination output port buffer unit.

(e). sending the packet header in the temporary buffer unit to the destination output port buffer unit (one output port buffer unit which corresponds to the packet header in the temporary buffer unit) having at least an available memory unit.

Again the above process may also comprise a step of computing the number J of the temporary buffer units, and the length K of each of the temporary buffer units, so that the J is equal to [(M/N)−1], and the K is equal to (M−N), where N is computed so as to minimize the total capacity (number of memory units or logic gates) of all buffer including the temporary buffer units and the output port buffer units, while the process can still avoid the overflow possibly caused by the fact that the length of the output port buffer unit is less than the number M of the input ports.

The present invention may best be understood through the following description with reference to the accompanying drawings, in which:

DETAILED DESCRIPTION OF THE PREFERRED EMBODIMENTS

Figure 1:
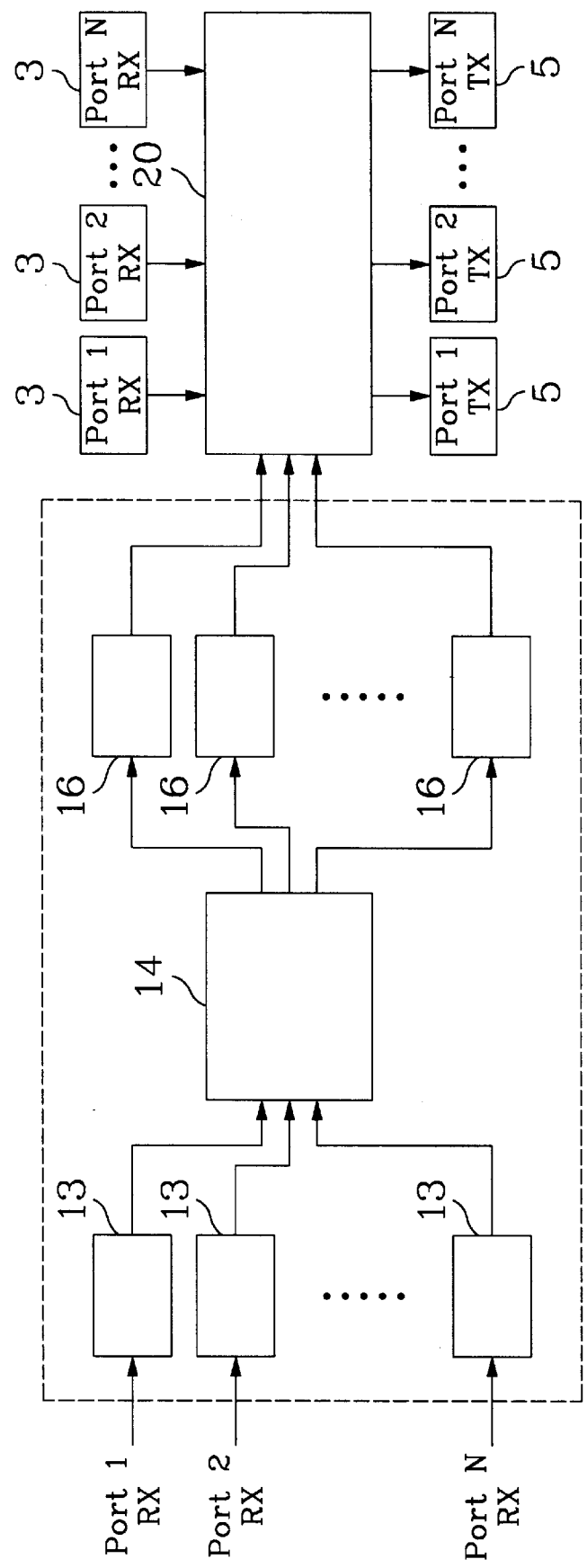
FIG. 1 shows a conventional Ethernet switch fabric controller.
Figure 2:
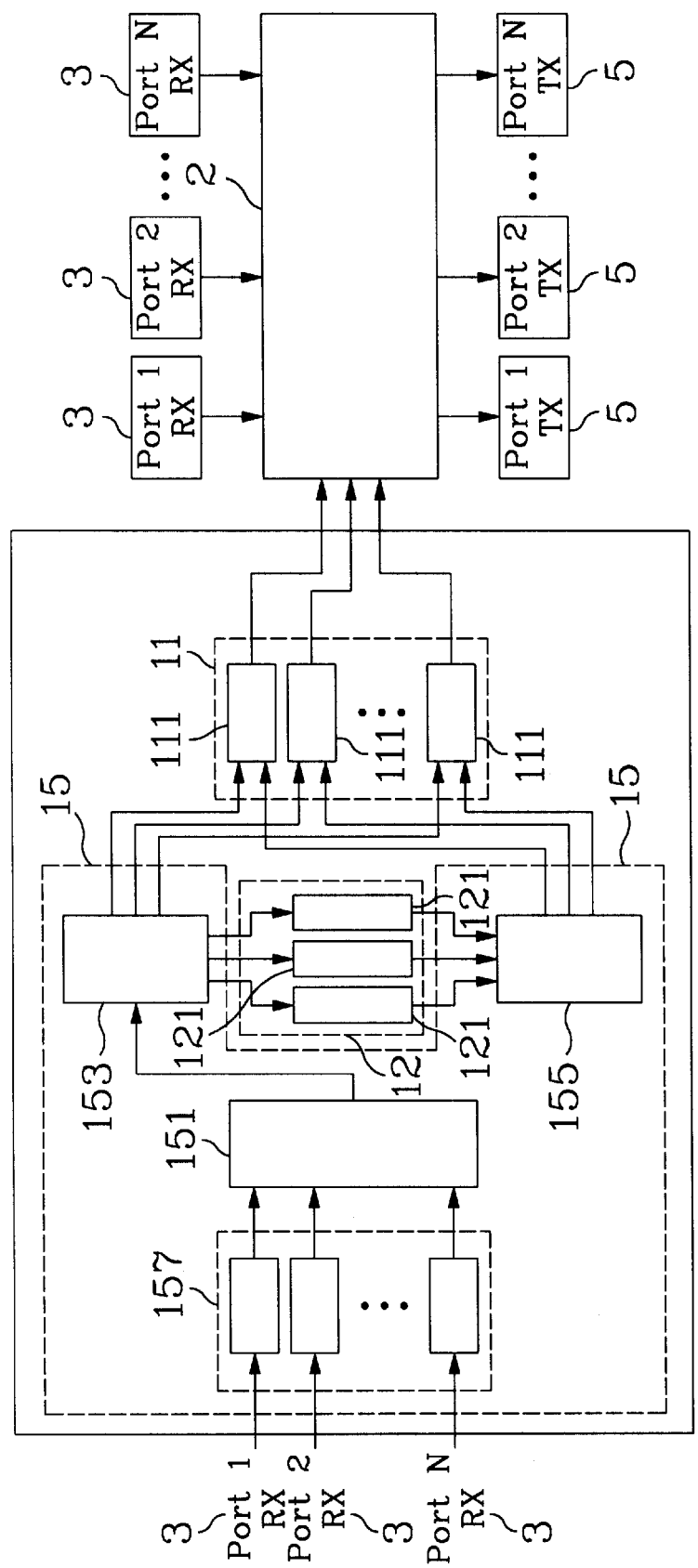
FIG. 2 shows a system for an embodiment of the present invention for replacing a conventional Ethernet switch fabric controller.

An embodiment of the present invention is a device shown in FIG. 2 for processing the forwarding of the packet header received by each input port of an Ethernet switch to an output port buffer unit, thereupon the Ethernet switch switches (or forwards) the packet at each input port to an output port according to the packet header in the output port buffer unit. Assume the Ethernet switch comprises 32 input ports (input port 1, input port 2 . . . , input port 32) each denoted by 3 (reference numeral) in the figure, and 32 output ports (output port 1, output port 2 . . . , output port 32) each denoted by 5 (reference numeral) in the figure. The device thus suggested by the present invention comprises:

an output port buffer block 11 including 32 output port buffer units 111 (output port buffer unit 1, output port buffer unit 2, . . . , output port buffer unit 32) each of length N;

a temporary buffer block 12 including J of temporary buffer units 121 (temporary buffer unit 1, temporary buffer unit 2, . . . , temporary buffer unit j) each of length K, where J and K being integers; and a processor 15 possibly embodied by a CPU or logic circuit for forwarding the packet header received by an input port to a corresponding output port buffer unit in case the corresponding output port buffer unit is in a first state, the corresponding output port buffer unit is one output port buffer unit corresponding to the packet header, and forwarding, in case the corresponding output port buffer unit is in a second state, the packet header to a corresponding temporary buffer unit which is one temporary buffer unit in a first state, and forwarding the packet header in the temporary buffer unit to the output port buffer unit having at least an available memory unit and corresponding to the packet header in the temporary buffer unit. The corresponding output port buffer unit is in the first state when having at least an available memory unit therein, and is in the second state when having no available memory unit therein. A temporary buffer unit is in the first state when having at least an available memory unit therein and having no packet header therein which is corresponded by any output port buffer unit different from the corresponding output port buffer unit that is an output port buffer unit corresponding to the packet header currently considered for being forwarded to the temporary buffer unit, i.e., a temporary buffer unit is in the first state when having at least an available memory unit therein and each packet header therein is corresponded by the corresponding output port buffer unit (the output port buffer unit which corresponds to the packet header currently considered for being forwarded to the temporary buffer unit). In other words, a temporary buffer unit is in the first state when having at least an available memory unit therein and each packet header therein has the same destination output port buffer unit.

In the embodiment N is smaller than the number of input ports or output ports, in order to avoid the requirement of a great number of memory units for an Ethernet switch fabric controller as adopted by prior arts. Let M represent the number of input ports (or output ports), J is chosen to equal [(M/N)−1], and K is chosen to equal (M−N), as suggested by the present invention and explained below.

It is reasonable to set a condition that no packet header will be admitted to an input port unless the input port currently has no packet header therein or has completed the processing (forwarding to a proper temporary buffer unit or output port buffer unit) of a packet header previously received, i.e., there are at most 32 packet headers in an Ethernet switch fabric controller if there are 32 input ports in the Ethernet switch working with the Ethernet switch fabric controller, for example.

Let's first consider the length of the temporary buffer unit. Given the number of input ports is M and the length of output port buffer unit is N (here N<M), the worst case is that the destination output port buffer unit (corresponding output port buffer unit) of the packet header in each of the M input ports 3 is the same at one time, resulting in the need of forwarding N packet headers to their destination output port buffer unit (the same output port buffer unit, one output port buffer unit 111 shown in the figure) and forwarding (M−N) packet headers to the same temporary buffer unit (one temporary buffer unit 121 in the figure), leading to the consideration of designing the temporary buffer unit 121 of length (M−N).

Let's now consider the number of temporary buffer units 121. In case the number of full output port buffer units (the output port buffer unit with every memory unit therein saving a packet header) at one time is M/N, there's no need of forwarding any packet header to any temporary buffer unit 121. Another case is that the number of full output port buffer units is (M/N−1) while there are N requests for entering these (M/N−1) full output port buffer units at the same time (there are N packet headers waiting to be forwarded to these full output port buffer units at the same time), therefore we may choose (M/N−1) as the number of temporary buffer units each of length (M−N). It can be seen the total number of the memory units (one memory unit for saving one packet header), including those [(M/N−1)*(M−N)] of all temporary buffer units 121 and those M*N of all output port buffer units 111, is {M*N+[(M/N)−1]*(M−N)}. For an example of 32 input ports (M=32 for a particular example) and 32 output ports in an Ethernet switch, a feasible configuration suggested by the present invention is that there are 32 output port buffer units each of length N, and [(M/N)−1] temporary buffer units each of length (32−N), with N to be selected for minimizing the number of memory units represented by {M*N+[(M/N)−1]*(M−N)}.

Figure 3:
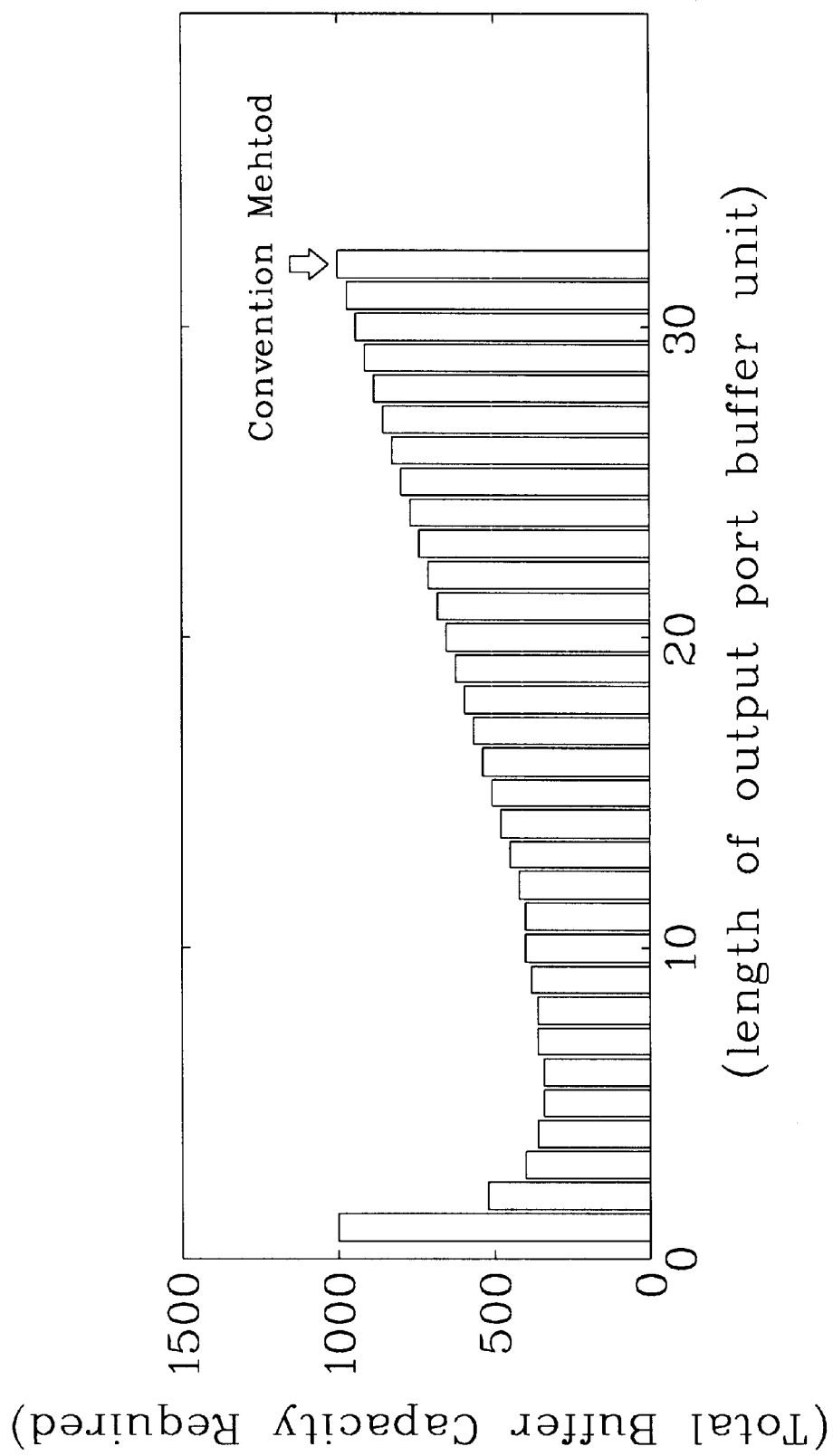
FIG. 3 illustrates a table for computing the optimum length of an output port buffer unit in the embodiment shown in FIG. 2 for an example where N=32.

FIG. 3 is a table showing the total number {M*N+[(M/N)−1]*(M−N)} of memory units with N ranging from 1 to M (M=32 for this particular example). It can be seen here the total number is minimum when N=5 or N=6 while the total number approximates the minimum for N=8 which is accompanied with lowest probability of incurring overflow, leading to the suggestion that N=8 is chosen, i.e., the Ethernet switch fabric controller may be designed so as to have its output port buffer unit of length 8 (the output port buffer unit has 8 memory units each for saving a packet header therein) and have M/N−1 (=32/8−1=3 for the particular example) temporary buffer units, i.e., the number of its temporary buffer units is 3, and the length of the temporary buffer unit is M−N (=32−8=24 for a particular example).

The above processor 15 according to the present invention may comprise: a retrieving controller 151, and a contention resolution controller 153; the retrieving controller 151 forwards the packet header from the input port 3 to the contention resolution controller 153, the contention resolution controller 153 checks if the corresponding output port buffer unit 111 is in the first state, and forwards the packet header to the corresponding output port buffer unit 111 in case the corresponding output port buffer unit 111 is in the first state, while forwards the packet header to the corresponding temporary buffer unit after identifying the corresponding temporary buffer unit among all the temporary buffer units 121 in temporary buffer block 12. For example, a temporary buffer unit in the first state is identified to be the corresponding temporary buffer unit for the packet header, where the temporary buffer unit in the first state is the temporary buffer unit having at least an empty memory unit therein, and with each packet header saved therein being corresponded by the destination output port buffer unit of the packet header currently considered for being forwarded, i.e., it is the temporary buffer unit having at least an empty memory unit therein, and with each packet header saved therein having the same destination output port buffer unit as that of the packet header considered for being forwarded, or a temporary buffer unit having at least an empty memory unit therein, and with each packet header saved therein corresponded by an output port buffer unit 111 which corresponds to the packet header currently considered for being forwarded.

The above processor 15 may further comprise a buffer controller 155 for checking if the output port buffer unit corresponding to the packet header in the temporary buffer unit has at least an available memory unit, and for forwarding the packet header in the temporary buffer unit to the output port buffer unit which corresponds to the packet header in the temporary buffer unit and has at least an available memory unit.

The above retrieving controller 151 is a sequential polling controller polling each input port cyclically to forward the packet header from the input port 3 to the contention resolution controller 153.

The above processor further comprises a plurality of command interpreters 157 each associated with one input port 3, and in a busy state when a packet header is received thereat the associated input port to wait for being forwarded to the contention resolution controller 153, and wherein the retrieving controller 151 recognizes the busy state to forward the packet header received at the associated input port to the contention resolution controller 153.

Figure 4:
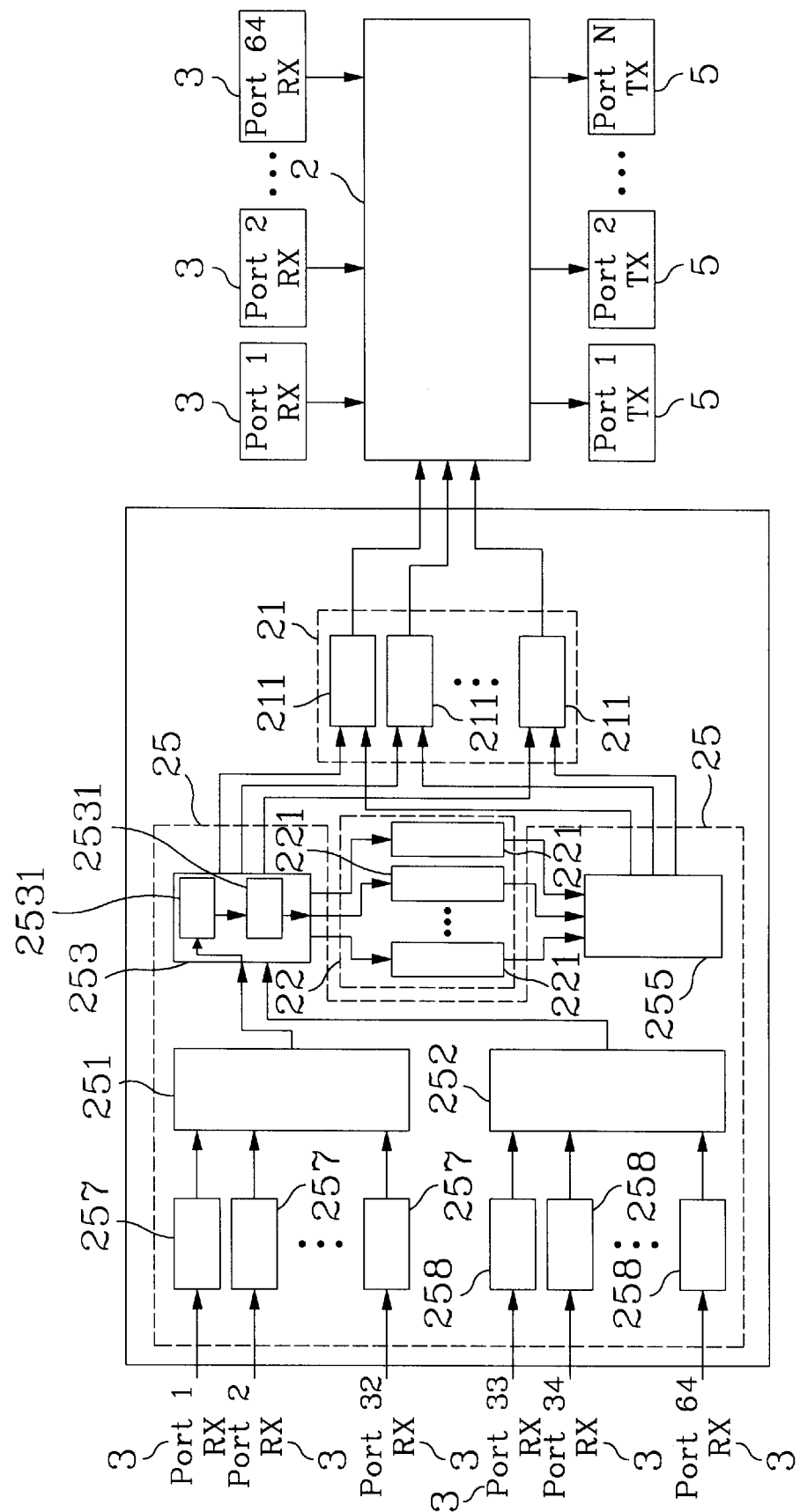
FIG. 4 shows a system for another embodiment of the present invention for replacing a conventional Ethernet switch fabric controller.

Another embodiment of the present invention is a device shown in FIG. 4 for processing the forwarding of packet header received by each input port 3 of an Ethernet switch to an output port buffer unit, thereupon the Ethernet switch switches (or forwards) the packet at each input port to an output port according to the packet header in each output port buffer unit. It is assumed that the Ethernet switch comprises M input ports and Q output ports, and M=64=Q for a particular example. The device may be configured to comprise:

an output port buffer block 21 including 64 output port buffer units 211 (output port buffer unit 1, output port buffer unit 2, . . . , output port buffer unit 64) each of length N;

a temporary buffer block 22 including J of temporary buffer units 221 (temporary buffer unit 1, temporary buffer unit 2, . . . ,temporary buffer unit j) each of length K, where J and K being integers; and a processor 25 comprising a plurality of P retrieving controllers (P=2 for a particular example) 251 and 252 assigned to respectively correspond to different groups of the input ports (2 groups each comprising 32 input ports for a particular example). Obviously the number of input ports in each group is not necessarily the same. Each retrieving controller 251 or forwards the packet header received by the corresponded group of the input ports to the processor 25. In case the corresponding output port buffer units of the packet headers forwarded by the retrieving controllers 251 or 252 to the processor 25 are different from each other, the processor 25 respectively sends the packet headers to the output port buffer units respectively corresponding to the packet headers of the packet header and having at least an available memory unit, and in case the corresponding output port buffer units of the packet headers forwarded by the retrieving controllers 252 and 251 are not different from each other, the processor 25 sends the packet headers having the same corresponding output port buffer units, in the order according to the timestamps representing the time of receiving the packet headers by the input ports, to the same corresponding output port buffer units having at least an available memory unit, while in case the corresponding output port buffer units having no available memory unit, the processor 25 sends the packet headers to the temporary buffer units 221 in a first state after identifying the temporary buffer units in the first state from among all the temporary buffer units in temporary buffer block 22; processor 25 sends the packet header in temporary buffer units 221 to the output port buffer units which respectively correspond to the packet headers of the packet headers in the temporary buffer units 221 and have at least an available memory unit.

The above processor 25 further comprises: a contention resolution controller 253 and a buffer controller 255. Each retrieving controller 251 or 252 forwards the packet headers received by the corresponded group of the input ports to the contention resolution controller 253, in case the corresponding output port buffer units 211 of the packet headers forwarded by the retrieving controllers 251 and 152 are different from each other, the contention resolution controller 253 sends the packet headers to the output port buffer units 211 respectively corresponding to the packet headers and having at least an available memory unit, and in case the corresponding output port buffer units 211 of the packet headers forwarded by the retrieving controllers 251 and 252 are not different from each other, the contention resolution controller 253 sends the packet headers having the same corresponding output port buffer unit, in the order according to the timestamps representing the time of receiving the packet headers by the input ports, to the same corresponding output port buffer unit having at least an available memory unit (whenever the same corresponding output port buffer unit has at least an available memory unit), while in case the corresponding output port buffer unit has no available memory unit, the contention resolution controller 253 sends the packet headers to the temporary buffer unit in the first state after identifying the temporary buffer unit in the first state from among all the temporary buffer units in temporary buffer block 22; the buffer controller 255 sends the packet headers in the temporary buffer units 221 to the corresponding output port buffer units (the output port buffer units 211 which respectively correspond to the packet headers in the temporary buffer units 121) having at least an available memory unit.

The above processor 25 according to the present invention may have its contention resolution controller 253 comprise a check-packet module 2531 and a check-BUFFER module 2532; the check-packet module 2531 checks if the corresponding output port buffer units 211 of the packet headers forwarded by the retrieving controllers 251 and 252 are different from each other, and sends the packet headers to the check-BUFFER module 2532 in case the corresponding output port buffer units 211 of the packet headers forwarded by the retrieving controllers 251 and 252 are different from each other, while compares, in case the corresponding output port buffer units 211 of the packet headers forwarded by the retrieving controllers 251 and 252 are not different from each other, the timestamps (each timestamp for indicating the time of receiving a packet header at an input port) of the packet headers having the same corresponding output port buffer unit 211, and sends the packet headers to the check-BUFFER module 2532 in the order according to the timestamps, the check-BUFFER module 2532 checks if the corresponding output port buffer unit 211 has at least an available memory unit, and sends the packet header to the corresponding output port buffer unit in case the corresponding output port buffer unit has at least an available memory unit, while sends the packet header to a temporary buffer unit 221 in the first state in case the corresponding output port buffer unit has no available memory unit; the buffer controller 255 recognizes the packet headers in the temporary buffer units 221, and checks if the output port buffer units 211 which respectively correspond to the packet headers have at least an available memory unit, and sends the packet headers in the temporary buffer units 221 to the output port buffer units 211 which respectively correspond to the packet headers and have at least an available memory unit.

The above retrieving controller 251 and 252 may be sequential polling controllers respectively and cyclically polling their corresponded groups of the input ports 3 to forward the packet header from the corresponded group of input ports to the contention resolution controller 253.

The above processor 25 may further comprise a plurality of command interpreters (32 of command interpreters 257 and 32 of command interpreters, for a particular example) each associated with one input port and in a busy state when a packet header is received thereat the associated input port to wait for being forwarded to the contention resolution controller 253, and the retrieving controller 251 and 252 simultaneously pool (cyclically inquire each among a group) their respectively corresponded groups by recognizing the busy state of the command interpreters 257 and 258 respectively associated with each input port in their corresponded groups, to forward the packet header at the associated input port to the contention resolution controller 253.

The same as the aforementioned relevant explanation, here J is chosen to equal [(M/N)−1], and K is chosen to equal (M−N), and the total number of all memory units is {M*N+ [(M/N)−1]*(M−N)}.

Figure 5:
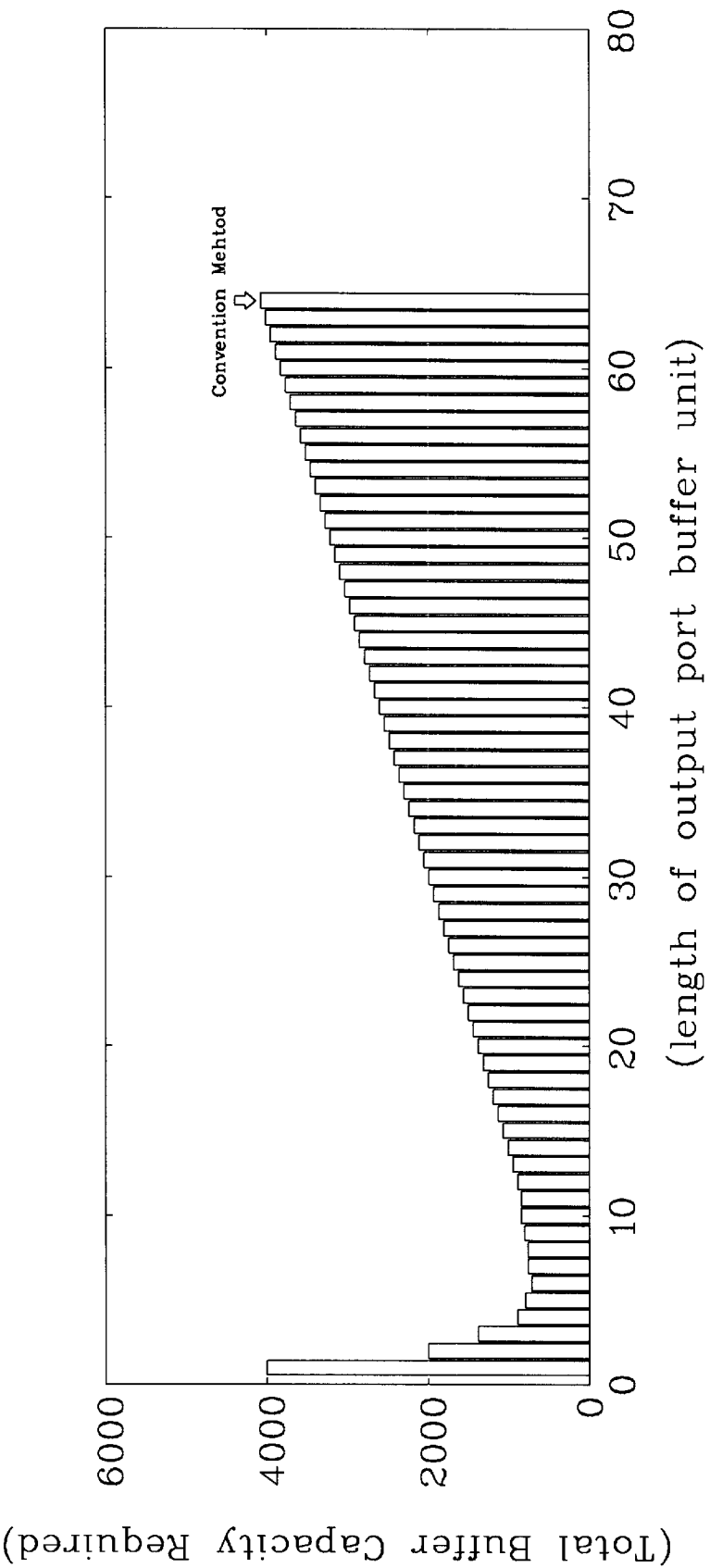
FIG. 5 illustrates a table for computing the optimum length of an output port buffer unit in the embodiment shown in FIG. 4 for an example where there are 64 input ports.

FIG. 5 is a table showing the total number {M*N+[(M/N)−1]*(M−N)} of memory units with N ranging from 1 to M (M=64 for this particular example). It can be seen here the total number is minimum when N=8, leading to the suggestion that N=8 is chosen, i.e., the Ethernet switch fabric controller may be designed so as to have its output port buffer unit of length 8 (the output port buffer unit has 8 memory units each for saving a packet header therein) and have M/N−1 (=64/8−1=7 for the particular example) temporary buffer units, i.e., the number of its temporary buffer units is 7, and the length of the temporary buffer unit is M−N (=64−8=56 for the particular example).

A further aspect of the present invention is a process for forwarding the packet header received by each input port of an Ethernet switch to an output port buffer unit, thereupon the Ethernet switch switches (or forwards) the packet at each input port to an output port according to the packet header in each output port buffer unit. It is assumed here that the Ethernet switch comprises M input ports and M (M is not necessarily equal to Q) output ports, and the number of output port buffer units is M, each output port buffer unit is of length N. The process comprises, referring to the system shown in FIG. 2, the steps of:

(a). recognizing the packet header received by the input port (another alternative is retrieving the packet header from the input port to a resolution controller and recognizing it in the resolution controller);

(b). identifying the output port buffer unit which corresponds to the recognized packet header as a destination output port buffer unit;

(c). checking if the destination output port buffer unit has at least an available memory unit;

(d). in case there is at least an available memory unit in the destination output port buffer unit, forwarding the packet header from the input port to the destination output port buffer unit;

(e). in case there is no available memory unit in the destination output port buffer unit, forwarding the packet header from the input port to a temporary buffer unit which is in a first state;

(f). whenever one corresponding output port buffer unit, which is one output port buffer unit 111 corresponding to the packet header in the temporary buffer unit, has at least an available memory unit, forwarding the packet header in the temporary buffer unit to the corresponding output port buffer unit 111.

For the above process, the temporary buffer unit is in the first state when having at least an available memory unit and having no packet header therein corresponded by one output port buffer unit 211 different from the destination output port buffer unit of the recognized packet header currently to be forwarded to the temporary buffer unit. In other words, the temporary buffer unit is in the first state when having at least an available memory unit therein and the destination output port buffer unit of the recognized packet header currently to be forwarded thereto corresponds to each packet header therein.

The above process further comprises a step of computing the number J of the tbus, and the length K of the tbu, so that the J is equal to [(M/(N)−1], and the K is equal to (M−N), and N is computed so as to reduce the number of memory units, thereby reduce the number of logic gates constituting all the output port buffer units 211 and the temporary buffer units 221.

The above process further comprises, before step (a), a step of detecting the packet header received by each input port 3.

The above step (e) comprises the steps of: in case there is no available memory unit in the destination output port buffer unit, identifying one temporary buffer unit in the first state from among all the temporary buffer units in temporary buffer block 12 as a destination temporary buffer unit, forwarding the packet header from the input port to the destination temporary buffer unit.

The above step (f) comprises the steps of:
- (f-1). recognizing the packet header in each temporary buffer unit 221;
- (f-2). identifying the output port buffer unit which corresponds to the packet header in the temporary buffer unit as a temp-to-destination output port buffer unit;
- (f-3). checking if the temp-to-destination output port buffer unit has at least an available memory unit;
- (f-4). in case there is at least an available memory unit in the temp-to-destination output port buffer unit, forwarding the packet header from the temporary buffer unit to the temp-to-destination output.

Another algorithm aspect of the present invention is a process for forwarding, in a system such as that shown in FIG. 4, the packet header received by each input port 3 of an Ethernet switch 2, to an output port buffer unit 211 of length N, the Ethernet switch 2 comprises M input ports in P groups, and Q output ports, the number of output port buffer units 211 is Q, the process comprises the steps of:
- (a). simultaneously applying pooling in each of the groups for recognizing, one by one, the packet headers received by the input ports 3 in each of the groups;
- (b). identifying destination output port buffer units among the output port buffer units 211, the destination output port buffer units being the output port buffer units 211 which respectively correspond to the recognized packet headers;
- (c). in case the destination output port buffer units are different from each other, respectively sending the recognized packet headers to the destination output buffer units having at least an available memory unit, and respectively sending the recognized packet header to a temporary buffer unit in a first state when the destination output port unit has no available memory unit, while in case the destination output port buffer units are not different from each other, sending the recognized packet headers corresponded by the same destination output port buffer unit, in the order according to the timestamps representing the time of receiving the recognized packet headers by the input ports 3, to the same destination output port buffer unit which has at least an available memory unit, and sending the recognized packet headers to the temporary buffer units which are in the first state when the destination output port buffer unit has no available memory unit.
- (d). sending the packet header in the temporary buffer unit 221 to the destination output port buffer unit (one output port buffer unit 211 which corresponds to the packet header in the temporary buffer unit 221) having at least an available memory unit, i.e., sending the packet header in the temporary buffer unit 221 to one of the output port buffer unit 211 which corresponds to the packet header in the temporary buffer unit 221 and has at least an available memory unit.

The above step (c) comprises the step of identifying the temporary buffer unit in the first state from among the temporary buffer units 221, the temporary buffer unit in the first state is one of the temporary buffer units 221 which has an available memory unit and has no packet header therein corresponded by an output port buffer unit 211 that is different from the destination output port buffer unit of the recognized packet header to be forwarded thereto. In other words, the temporary buffer unit in the first state is one of the temporary buffer units 221 which has an available memory unit and has each packet header therein corresponded by the destination output port buffer unit of the recognized packet header to be forwarded thereto, i.e., the temporary buffer unit in the first state is one of the temporary buffer units 221 which has an available memory unit and has each packet header therein corresponded by the output port buffer unit corresponding to the recognized packet header to be forwarded thereto.

The above step (c) may also be embodied to comprise the steps of:
- (c-1). checking if each of the destination output port buffer units has at least an available memory unit;
- (c-2). in case the destination output port buffer units are different from each other, respectively sending the recognized packet headers to the destination output port buffer units having at least an available memory unit, and respectively sending the recognized packet header to a temporary buffer unit in a first state when the destination output port unit has no available memory unit, while in case the destination output port buffer units are not different from each other, sending the recognized packet headers corresponded by the same destination output port buffer unit, in the order according to the timestamps representing the time of receiving the recognized packet headers by the input ports 3, to the same destination outputport buffer unit which has at least an available memory unit, and sending the recognized packet header to one of the temporary buffer-units 221 which is in the first state unit when the destination output port buffer unit of the recognized packet header has no available memory unit.

The above step (d) comprises the steps of:
- (d-1). checking the packet header in each temporary buffer unit 221;
- (d-2). identifing, among the output port buffer units 211, the destination output port buffer unit of the packet header in each temporary buffer 221;
- (d-3). checking if the destination output port buffer unit has at least an available memory unit;
- (d-4). sending the packet header in the temporary buffer unit 221 to the destination output port buffer unit which has at least an available memory unit.

Based on the same algorithm as that for the above process embodiment, the process here also comprises a step of computing the J, and the K, so that the J is equal to [(M/N)−1], and the K is equal to (M−N), and a step of computing the N which reduces the number of memory units in order to reduce the logic gates constituting all the output port buffer units 211 and the temporary buffer units 221.

The above step (a) comprises one step of producing a busy state signal at each input port 3 in response to a packet header received thereat, for enabling the packet header at each input port 3 to be recognized right after it is received by the input port 3.

The other algorithm aspect of the present invention is a process for forwarding, in the system such as that shown in FIG. 4, the packet header received by each input port 3 of an Ethernet switch 2 to an output port buffer unit 211 of length N, the Ethernet switch 2 comprises M input ports in P groups, and Q output ports, the number of output port buffer units 211 is Q, the process comprises the steps of:

(a). simultaneously applying pooling in each of the groups for retrieving, one in one time interval, the packet headers received by the input ports 3 in each of the groups;

(b). identifying destination output port buffer units among the output port buffer units 211, the destination output port buffer units 211 being the output port buffer units 211 which respectively correspond to the retrieved packet headers;

(c). in case the destination output port buffer units are different from each other, respectively sending the retrieved packet headers to the destination output buffer units having at least an available memory unit, and respectively sending the retrieved packet header to a temporary buffer unit in a first state when the destination output port unit has no available memory unit, while in case the destination output port buffer units are not different from each other, sending the retrieved packet headers corresponded by the same destination output port buffer unit, in the order according to the timestamps representing the time of receiving the retrieved packet headers by the input ports 3, to the same destination output port buffer unit which has at least an available memory unit, and sending the retrieved packet header to one of temporary buffer units 221 which is in the first state when the destination output port buffer unit has no available memory unit.

(d). sending the packet header in the temporary buffer unit to the destination output port buffer unit (one output port buffer unit 211 which corresponds to the packet header in the temporary bufferunit 221) having at least an available memory unit, i.e., sending the packet header in the temporary buffer unit 221 to one of the output port buffer unit 211 which corresponds to the packet header in the temporary buffer unit 221 and has at least an available memory unit.

There is still another algorithm aspect of the present invention wherein a process is embodied for forwarding, in the system such as that shown in FIG. 4, the packet header received by each input port 3 of an Ethernet switch 2 to an output port buffer unit 211 of length N, the Ethernet switch 2 comprises M of input ports, and Q output ports, the number of output port buffer units 211 is M, the process comprises the steps of:

(a). separating(or dividing) the M input ports into at least two groups;

(b). simultaneously applying pooling in each of the groups for recognizing, one in one time interval, the packet headers received by the input ports 3 in each of the groups;

(c). identifying destination output port buffer units 211 among the output port buffer units 211, the destination output port buffer units 211 being the output port buffer units 211 which respectively correspond to the recognized packet headers;

(d). in case the destination output port buffer units are different from each other, respectively sending the recognized packet headers to the destination output buffer units having at least an available memory unit, and respectively sending the recognized packet header to a temporary buffer unit in a first state when the destination output port unit has no available memory unit, while in case the destination output port buffer units are not different from each other, sending the recognized packet headers corresponded by the same destination output port buffer unit, in the order according to the timestamps representing the time of receiving the recognized packet headers by the input ports 3, to the same destination output port buffer unit which has at least an available memory unit, and sending the recognized packet header to one of temporary buffer units 221 which is in the first state when the destination output port buffer unit has no available memory unit.

(e). sending the packet header in the temporary buffer unit 221 to the destination output port buffer unit (one output port buffer unit 211 which corresponds to the packet header in the temporary buffer unit 221) having at least an available memory unit, i.e., sending the packet header in the temporary buffer unit 221 to one of the output port buffer unit 211 which corresponds to the packet header in the temporary buffer unit 221 and has at least an available memory unit.

Again Based on the same algorithm as that for the above process embodiment, the process here also comprises a step of computing the J, and the K, so that the J is equal to [(M/N)−1], and the K is equal to (M−N), and a step of computing the N which reduces the number of memory units in order to reduce the logic gates constituting all the output port buffer units 211 and the temporary buffer units 221.

While the invention has been described in terms of what are presently considered the most practical and preferred embodiments, it shall be understood that the invention is not limited to the disclosed embodiments. On the contrary, it is intended to cover various modifications and similar arrangements included within the spirit and scope of the claims which are to be accorded with the broadest interpretation so as to encompass all modifications and similar structures.

What is claimed is:

1. A device for processing the forwarding of the packet header received by each input port of an Ethernet switch to an output port buffer unit of length N, the Ethernet switch comprises M input ports, and Q output ports, the number of the output port buffer units is L, said device comprising:

J of temporary buffer units each of length K, where J and K being integers; and a processor for forwarding the packet header received by said input port to a corresponding output buffer unit in case said corresponding output buffer unit is in a first state, said corresponding output buffer unit is one said output port buffer unit corresponding to said packet header, and forwarding, in case said corresponding output buffer unit is in a second state, said packet header to a corresponding temporary buffer unit which is one said temporary buffer unit in a first state, and forwarding the packet header in said temporary buffer unit to the output port buffer unit having at least an available memory unit and corresponding to the packet header in said temporary buffer unit.

2. The device according to claim 1 wherein said corresponding output buffer unit is in said first state when having at least an available memory unit therein, and is in said second state when having no available memory unit therein, and wherein said temporary buffer unit is in said first state when having at least an available memory unit therein and having no packet header therein corresponded by one said output buffer unit different from said corresponding output buffer unit.

3. The device according to claim 1 wherein said corresponding output buffer unit is in said first state when having at least an available memory unit therein, and is in said second state when having no available memory unit therein, and wherein said temporary buffer unit is in said first state when having at least an available memory unit therein and having each packet header therein corresponded by said corresponding output buffer unit.

4. The device according to claim 1 wherein said Q, said M, and said L are equal, said N is smaller than said M, said J is equal to [(M/N−1] and said K is equal to (M−N) in case M is divisible by N while said J is equal to U−1+[R/U] in case M is not divisible by N, where U is the largest integer less than the real value of M/N and R is the difference value between the real value of M/N and said U, and [R/U] is the largest integer less than the real value of R/U.

5. The device according to claim 1 wherein said processor comprises:

a retrieving controller; and a contention resolution controller;

said retrieving controller forwarding said packet header from said input port to said contention resolution controller, said contention resolution controller checks if said corresponding output buffer unit is in said first state, and forwarding said packet header to said corresponding output buffer unit in case said corresponding output buffer unit is in said first state, while forwarding said packet header to said corresponding temporary buffer unit after identifying said corresponding temporary buffer unit among said temporary buffer units.

6. The device according to claim 5 wherein said processor further comprises a temporary buffer unit controller for checking if the output port buffer unit corresponding to the packet header in said temporary buffer unit has at least an available memory unit, and for forwarding the packet header in said temporary buffer unit to the output port buffer unit which corresponds to the packet header in said temporary buffer unit and has at least an available memory unit.

7. The device according to claim 5 wherein said retrieving controller is a sequential polling controller polling each said input port cyclically to forward said packet header from said input port to said contention resolution controller.

8. The device according to claim 5 wherein said processor further comprises a plurality of command interpreters each associated with one said input port, and in a busy state when a packet header is received thereat the associated input port to wait for being forwarded to said contention resolution controller, and wherein said retrieving controller recognizes said busy state to forward the packet header at the associated input port which is in said busy state to said contention resolution controller.

9. A process for forwarding the packet header received by each input port of an Ethernet switch to an output port buffer unit of length N, the Ethernet switch comprises M input ports and Q output ports, the number of the output port buffer units is L, said N is less than M, said process comprising the steps of:

(a). recognizing the packet header received by said input port;

(b). identifying the output port buffer unit which corresponds to the recognized packet header as a destination output buffer unit;

(c). checking if said destination output buffer unit has at least an available memory unit;

(d). in case there is at least an available memory unit in said destination output buffer unit, forwarding the recognized packet header from said input port to said destination output buffer unit;

(e). in case there is no available memory unit in said destination output buffer unit, forwarding said packet header from said input port to one of a plurality of temporary buffer units which is in a first state;

(f). whenever one corresponding output port buffer unit, which is one said output port buffer unit corresponding to the packet header in said temporary buffer unit, has at least an available memory unit, forwarding the packet header in said temporary buffer unit to said corresponding output buffer unit.

10. The process according to claim 9 wherein said temporary buffer unit is in said first state when having at least an available memory unit and having no packet header therein corresponded by one said output port buffer unit different from said destination output buffer unit.

11. The process according to claim 9 wherein said temporary buffer unit is in said first state when having at least an available memory unit therein and said destination output buffer unit corresponds to each packet header therein.

12. The process according to claim 9 further comprising a step of computing the number J of said temporary buffer units, and the length K of said temporary buffer units, so that said J is equal to [(M/N)−1], and said K is equal to (M−N).

13. The process according to claim 9 further comprising a step of computing said N which reduces the number of memory units constituting said output port buffer units and said temporary buffer units.

14. The process according to claim 9 further comprising, before step (a), a step of detecting the packet header received by each said input port.

15. The process according to claim 9 wherein step (e) comprises the steps of:

in case there is no available memory unit in said destination output buffer unit, identifying one temporary buffer unit in said first state from among said temporary buffer units as a destination temporary buffer unit, forwarding the recognized packet header from said input port to said destination temporary buffer unit.

16. The process according to claim 9 wherein step (f) comprises the steps of:

(f-1). recognizing the packet header in each said temporary buffer unit;

(f-2). identifying the output port buffer unit which corresponds to the recognized packet header in said temporary buffer unit as a temporary-to-destination output buffer unit;

(f-3). checking if said temporary-to-destination output buffer unit has at least an available memory unit;

(f-4). in case there is at least an available memory unit in said temporary-to-destination output buffer unit, forwarding the recognized packet header from said temporary buffer unit to said temporary-to-destination output buffer unit.

17. The process according to claim 9 further comprising a step of determining said L such that said L equals said Q.

* * * * *